United States Patent Office 2,758,607
Patented Aug. 14, 1956

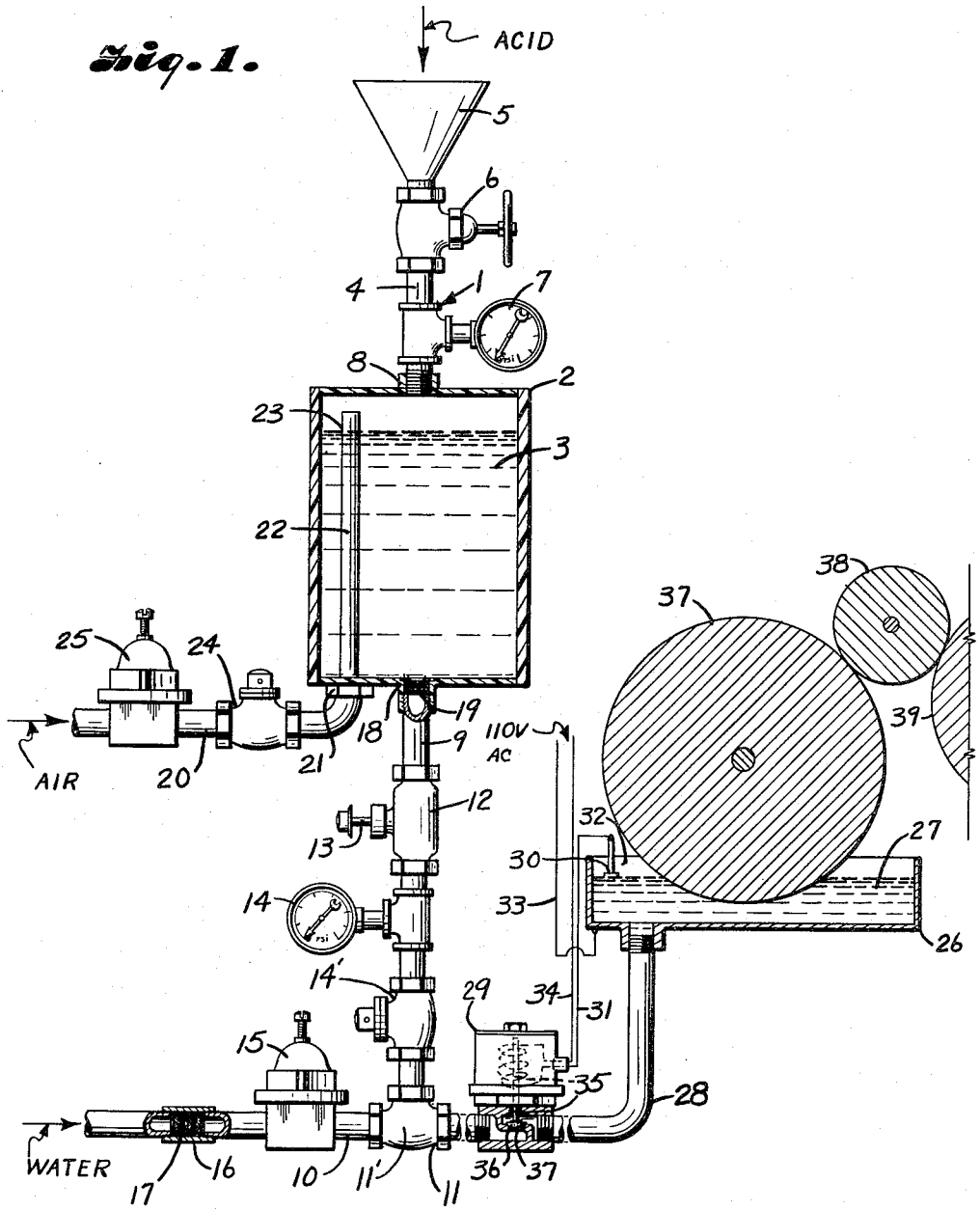

2,758,607

APPARATUS FOR APPLYING A LIQUID SOLUTION TO OFFSET PRESSES

John H. Patterson and Clyde Sumner, Kansas City, Mo.

Application May 18, 1953, Serial No. 355,823

1 Claim. (Cl. 137—114)

This invention relates to apparatus for applying a solution to offset presses, and more particularly to the application of an acid-water solution to the water fountain of a lithograph press or to printing rolls to prevent ink from adhering to non-printing surfaces of the printing roll.

The principal object of the invention resides in the mixture of the liquid to maintain a level of the liquid in the tank for application to the rolls.

Other objects of the invention are to provide means for mixing acid and water from a source of supply in predetermined amounts regulated by the level of the liquid in the tank in which the applicator roller contacts the liquid; to provide a container for containing the acid and maintaining an air pressure above the liquid in the container to overcome the pressure in the water line so that the acid will become mixed with the water at the point of juncture in the line in which the two meet; to provide means for determining the pressure in the tank containing the acid and in the line leading from the tank to the water line; to provide a needle valve in the line leading from the tank containing the acid to the water line so as to regulate flow of the acid thereto; to provide a solenoid in the line leading from the mixture of the acid and water to the tank containing the solution, the tank having an electrode for operating the solenoid when the liquid in the tank falls below a predetermined level whereby the solenoid will open a valve in the line to allow a supply of the mixed solution to flow to the tank; to provide means in the water line and the line from the acid tank to the water line for screening out dirt or other foreign matter from the line; and to provide a device of this character automatically operated for keeping offset printing rollers clean.

In accomplishing these and other objects of the invention, we have provided improved structure, the preferred form of which is illustrated in the accompanying drawing wherein:

The sole figure of the drawing is a diagrammatic view of our invention with parts broken away to better illustrate same and the rollers being shown in cross section and merely illustrating the invention.

Referring more in detail to the drawing:

1 designates generally the apparatus for supplying a solution to offset presses embodying the features of our invention, comprising a container 2 for a chemical such as acid, as indicated at 3. The chemical is admitted to the container through a line 4 having a funnel 5 at the upper end and a shutoff valve 6, the line 4 also being provided with a pressure indicator 7 for determining the air pressure in the container 2 as later described, the line being connected to the top of the container as indicated at 8. A line 9 leads from the bottom of the container 2 and connects with a water line 10 from a source of supply not shown, lines 9 and 10 being connected by a T-fitting 11 providing a mixing chamber 11' for the water and chemical.

The line 9 has a valve 12 provided with a stem 13 having a needle point (not shown) as is the usual practice for regulating flow of the chemical from the container 2. Line 9 is also provided with a pressure indicator 14 to determine pressure of water with respect to the pressure in the container 2, and also has a check valve 14' to shut off flow of chemical from the container when desired. The water line 10 has a regulator valve 15 to regulate the flow of water into line 10 and is also provided with a collar 16 provided with a plurality of screens 17 for collecting dirt and other foreign matter in the water and preventing same from flowing on into the apparatus. The outlet 18 from the bottom of the acid tank 2 is also provided with a plurality of screens 19 for collecting dirt and other foreign matter in the bottom of the tank and preventing same from flowing to mixture with the water.

The line 20 is connected to the bottom of the tank 2 as indicated at 21 and has a tube 22 extending upwardly to above the level of the acid in the tank as indicated at 23. A check valve 24 is supplied in line 20 and also a regulator valve 25 to regulate the air pressure in chamber 2. Air from a source (not shown) is supplied to the line 20 to above the level of the acid in the tank 2 for a purpose later described.

A tank 26 is provided for the chemical solution consisting of the mixture of acid and water as indicated at 27 and a line 28 connects the mixing chamber 11' with the bottom of the tank 26 for flow of the solution to the tank.

A quick acting solenoid valve 29 is connected in the line 28 near the mixing chamber 11' and is operated by an electrode 30, fastened at level desired in tank 26. A line 31 leads from the solenoid 29 to the electrode 30 secured to the side 32 of the tank 26 and is insulated therefrom as is the usual practice. A ground wire 33 leads from a source of supply (not shown) to the bottom of the tank 26 through the acid solution to electrode 30 to solenoid 29 through line 31. Line 34 from the solenoid to source of supply completes the circuit. The solenoid valve 29 includes a stem 35 having a head 36 adapted to engage a seat 37 to shut off the supply of liquid to the tank 26 when the liquid in the tank is at the desired level.

The apparatus thus far described is arranged in particular relation to offset printing presses so that an applicator roller 37 is mounted to contact the liquid 27 in the tank 26 and pick it up and transfer it to rollers 38 and 39 respectively, then transfer it to printing cylinders (not shown) to prevent ink from adhering to the non-printing surfaces of such printing cylinders.

Operation of an apparatus constructed and assembled as described is as follows:

The acid or other chemical may be supplied to the tank 2 through the funnel 5 and line 4. Air pressure entering line 20 is regulated by valve 25 so that there will be less air pressure above the chemical 3 in the tank 2 than water pressure in line 10. Water is supplied through line 10 and regulated by valve 15. The pressure gauge 7 in line 4 will indicate the amount of pressure exerted on the acid in the tank 2 and the pressure regulator 14 in the line 9 indicates the water pressure in line 10 with respect to the pressure in the container 2. The amount of chemical flowing from tank 2 through line 9 to be mixed with the water in the mixing chamber 11' is regulated by the needle valve 12 in conjunction with the adjustments of the regulator valves 15 and 25 respectively so that the water and chemical will be mixed in the mixing chamber 11' and flow on to line 28.

The amount of the mixed solution flowing through line 28 to tank 26 is regulated by the solenoid 29 and electrode 30. When the solution 27 in the tank 26 falls below the electrode 30 the solenoid is energized and the pressure of the solution on the head 36 of the solenoid valve will raise the stem and the head to allow flow of the solution through line 28 to tank 26. Opening of the solenoid valves relieves the pressure on the water line 10 allowing the chemical to mix with the water in the mixing chamber. When the supply of solution in the tank 26 again reaches the electrode the solenoid will be deenergized to cause the valve to again resume its seat 37 and shut off the flow of solution to the tank.

It will be obvious from the foregoing that we have provided an improved apparatus for mixture of the liquid maintained by the level of the liquid in the tank or applicator for keeping offset printing cylinders clean.

What we claim and desire to secure by Letters Patent is:

Apparatus for applying a liquid solution to offset presses or the like comprising, a closed container for a quantity of liquid chemical, a line connected to the container for supplying the chemical thereto, means including a supply line communicating with the container above the level of the chemical for supplying gaseous fluid under pressure thereto, means in the gaseous fluid supply line for regulating the pressure applied to the chemical in the container, means for stopping flow of gaseous fluid pressure to the container, a valve in said chemical supply line to the container and operable when the means for supplying gaseous fluid pressure to the container is cut off to provide communication with the container to replenish the supply of chemical in the container, a pressure gauge in said chemical supply line for indicating the pressure in said container, a mixing chamber, a flow line connecting the container with the mixing chamber, a needle valve in said line for regulating flow of chemical from the container to the mixing chamber, a water line connected to the mixing chamber, a pressure regulating valve in said water line for regulating flow of water to the mixing chamber, a pressure gauge in the flow line connecting the container with the mixing chamber for indicating the pressure in the mixing chamber, a delivery line communicating with the mixing chamber for flow of the mixture of chemical and water therefrom, a valve in said delivery line for controlling flow of the mixture from the mixing chamber, and means in the flow line connecting the container with the mixing chamber and operable to open and close said flow line for flow of chemical to the mixing chamber only when the valve in the delivery line is open for flow of the chemical and water mixture from the mixing chamber.

References Cited in the file of this patent
UNITED STATES PATENTS

| | | |
|---|---|---|
| 688,980 | Zahm | Dec. 17, 1901 |
| 724,527 | Waterman | Apr. 7, 1903 |
| 833,045 | Graese | Oct. 9, 1906 |
| 1,154,002 | Crump | Sept. 21, 1915 |
| 1,346,898 | Kingsbury | July 20, 1920 |
| 2,003,544 | Jordhoy | June 4, 1935 |
| 2,528,423 | Chace | Oct. 31, 1950 |
| 2,543,522 | Cohen | Feb. 27, 1951 |